US012537618B2

(12) United States Patent
Hao et al.

(10) Patent No.: US 12,537,618 B2
(45) Date of Patent: Jan. 27, 2026

(54) METHODS AND APPARATUSES FOR MULTIPLEXING AND DEMULTIPLEXING OPTICAL SIGNALS CONFIGURED TO SUPPRESS THE FOUR-WAVE MIXING EFFECT

(71) Applicant: Source Photonics (Chengdu) Co., Ltd., Chengdu (CN)

(72) Inventors: Yi Hao, Chengdu (CN); Lihui Zhuang, Chengdu (CN); Lulu Sun, Chengdu (CN)

(73) Assignee: Source Photonics (Chengdu) Co., Ltd., Chengdu (CN)

(*) Notice: Subject to any disclaimer, the term of this patent is extended or adjusted under 35 U.S.C. 154(b) by 308 days.

(21) Appl. No.: 18/549,221

(22) PCT Filed: Aug. 22, 2023

(86) PCT No.: PCT/CN2023/114267
§ 371 (c)(1),
(2) Date: Sep. 6, 2023

(87) PCT Pub. No.: WO2025/039189
PCT Pub. Date: Feb. 27, 2025

(65) Prior Publication Data
US 2025/0096922 A1     Mar. 20, 2025

(51) Int. Cl.
*H04J 14/06* (2006.01)
*G02B 6/27* (2006.01)
(Continued)

(52) U.S. Cl.
CPC ............ *H04J 14/06* (2013.01); *G02B 6/2773* (2013.01); *G02B 27/0977* (2013.01); *G02B 27/283* (2013.01)

(58) Field of Classification Search
CPC ... H04J 14/06; G02B 6/2773; G02B 27/0977; G02B 27/283
See application file for complete search history.

(56) References Cited

U.S. PATENT DOCUMENTS 7,440,654 B2 * 10/2008 Kirk .................... G02B 6/29373
                                                            385/37
9,991,964 B2 *  6/2018 Du ........................ H04B 10/503
(Continued)

FOREIGN PATENT DOCUMENTS

| CN | 107078807 A | 8/2017 |
| CN | 110530056 A | 12/2019 |
| CN | 113169807 A | 7/2021 |

OTHER PUBLICATIONS

International Search Report, International Appl. No. PCT/CN2023/114267; May 20, 2024; China National Intellectual Property Administration, Beijing, China.
(Continued)

Primary Examiner — Kenneth N Vanderpuye
Assistant Examiner — Asif Shameem
(74) Attorney, Agent, or Firm — Central California IP Group, P.C.; Andrew D. Fortney

(57) ABSTRACT

Optical multiplexers, optical demultiplexers, optical transmitters including the optical multiplexers, optical modules including the optical transmitters and the optical demultiplexers, and methods of using the same are disclosed. The optical multiplexers include first and second beam combiners, a polarizing beam combiner, and an optical isolator. The first and second beam combiners each include a reflective surface and at least one filter, and are configured to combine individual optical signals having the same polarization state into a multi-channel polarized optical signal. However, the two separate multi-channel polarized optical signals having different polarization states. The polarizing beam combiner
(Continued)

includes one or more reflective surfaces and one or more polarization filters, and is configured to combine the multi-channel polarized optical signals into a multi-channel output signal. The optical demultiplexers are structurally similar to the optical multiplexers, but provide a complementary or reverse function.

The present multiplexers and demultiplexers reduce the four-wave mixing effect.

19 Claims, 5 Drawing Sheets

(51) Int. Cl.
*G02B 27/09* (2006.01)
*G02B 27/28* (2006.01)

(56) References Cited

U.S. PATENT DOCUMENTS

| | | |
|---|---|---|
| 10,203,455 B2 * | 2/2019 | Amit .................. G02B 27/1006 |
| 10,333,646 B2 * | 6/2019 | Tian ..................... H04B 10/503 |
| 11,405,108 B2 | 8/2022 | Shin et al. |
| 2018/0164515 A1 | 6/2018 | Amit |
| 2018/0212708 A1 | 7/2018 | Tian et al. |
| 2021/0104865 A1 | 4/2021 | Hu et al. |
| 2022/0014272 A1 | 1/2022 | Shin et al. |
| 2024/0106544 A1 * | 3/2024 | Kanazawa .............. H01S 5/068 |

OTHER PUBLICATIONS

Written Opinion, International Appl. No. PCT/CN2023/114267; May 20, 2024; China National Intellectual Property Administration, Beijing, China.

\* cited by examiner

[Fig. 1]
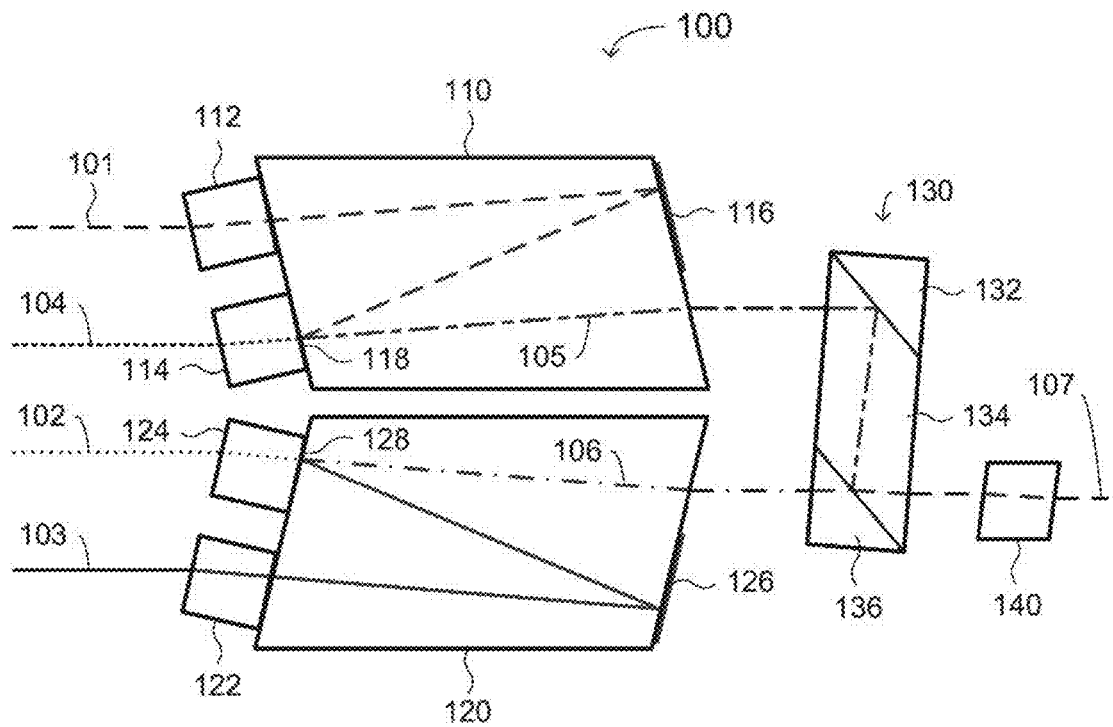
[Fig. 2]
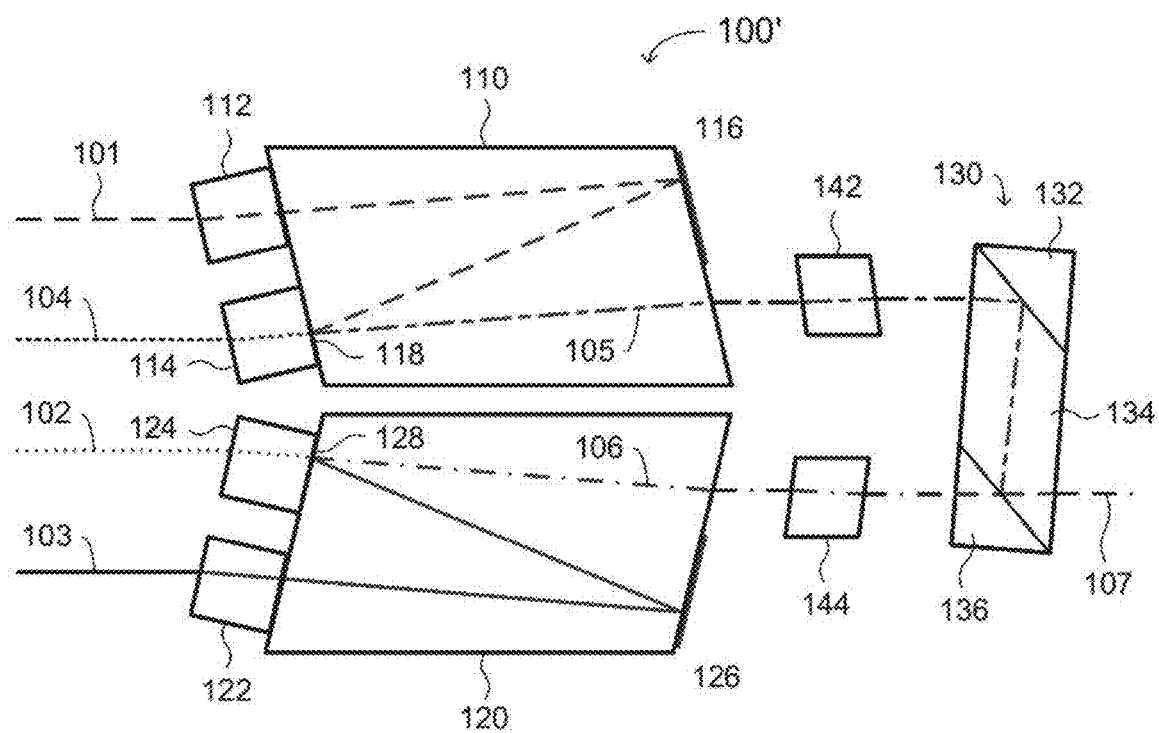

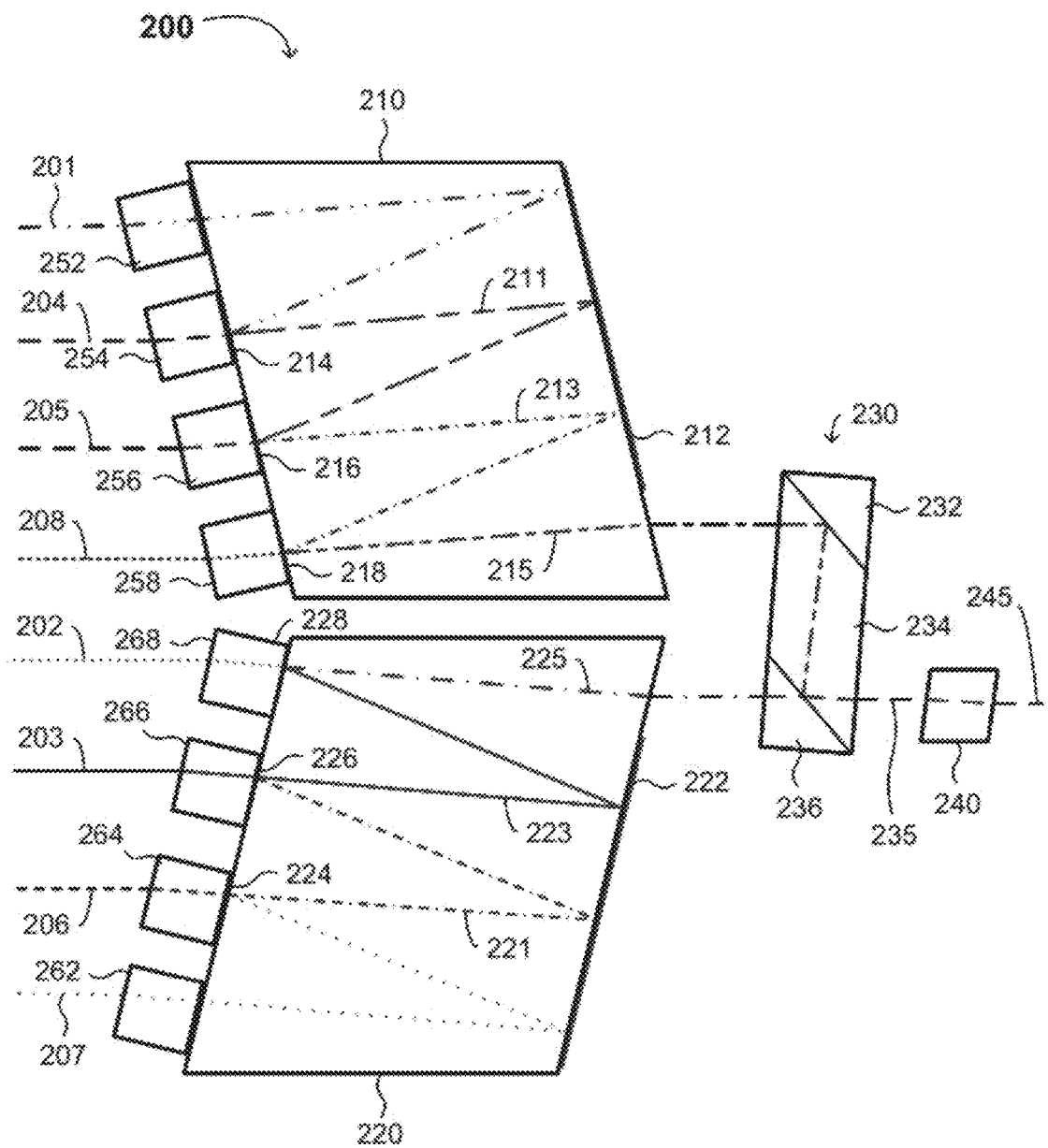
[Fig. 3]

[Fig. 4]
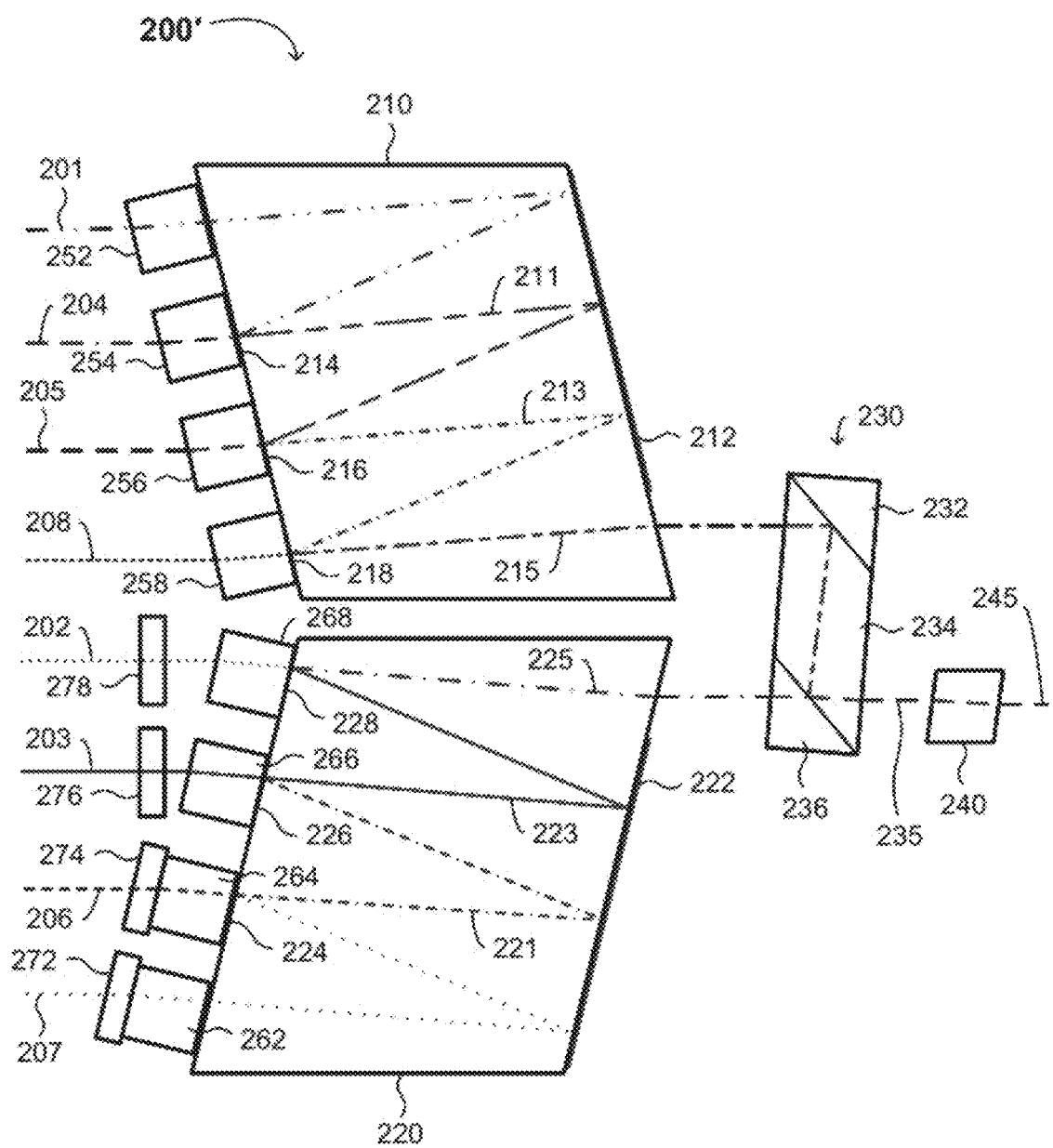

[Fig. 5]
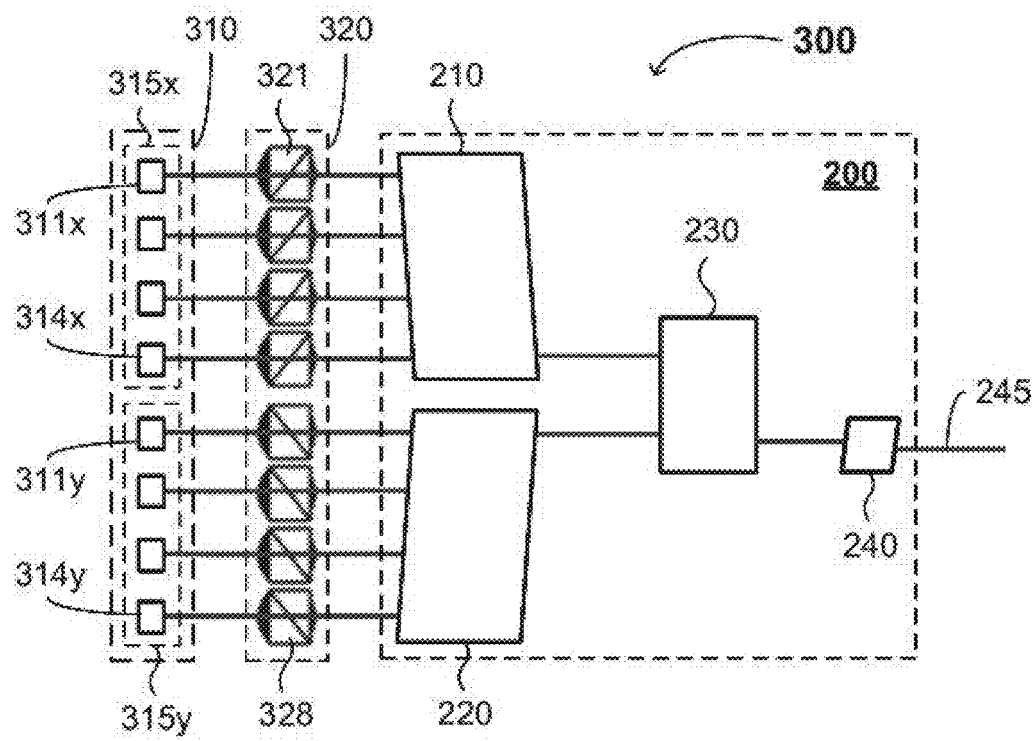
[Fig. 6]
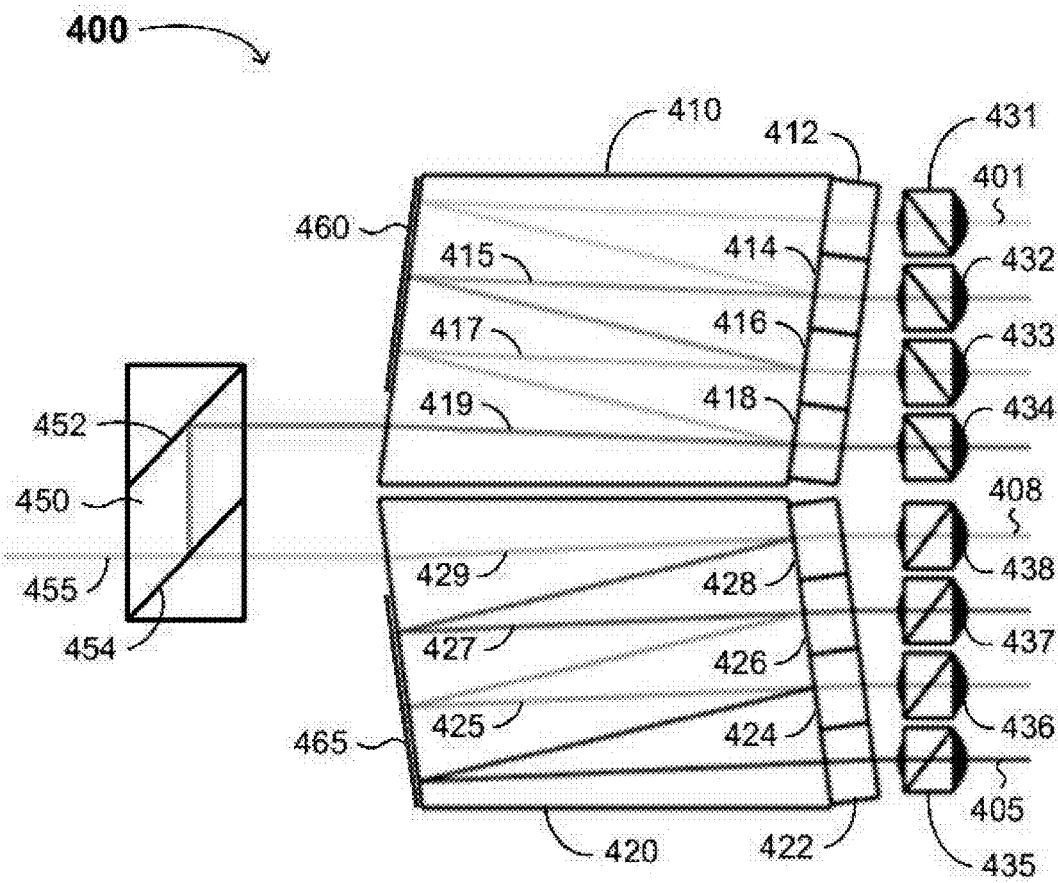

[Fig. 7]
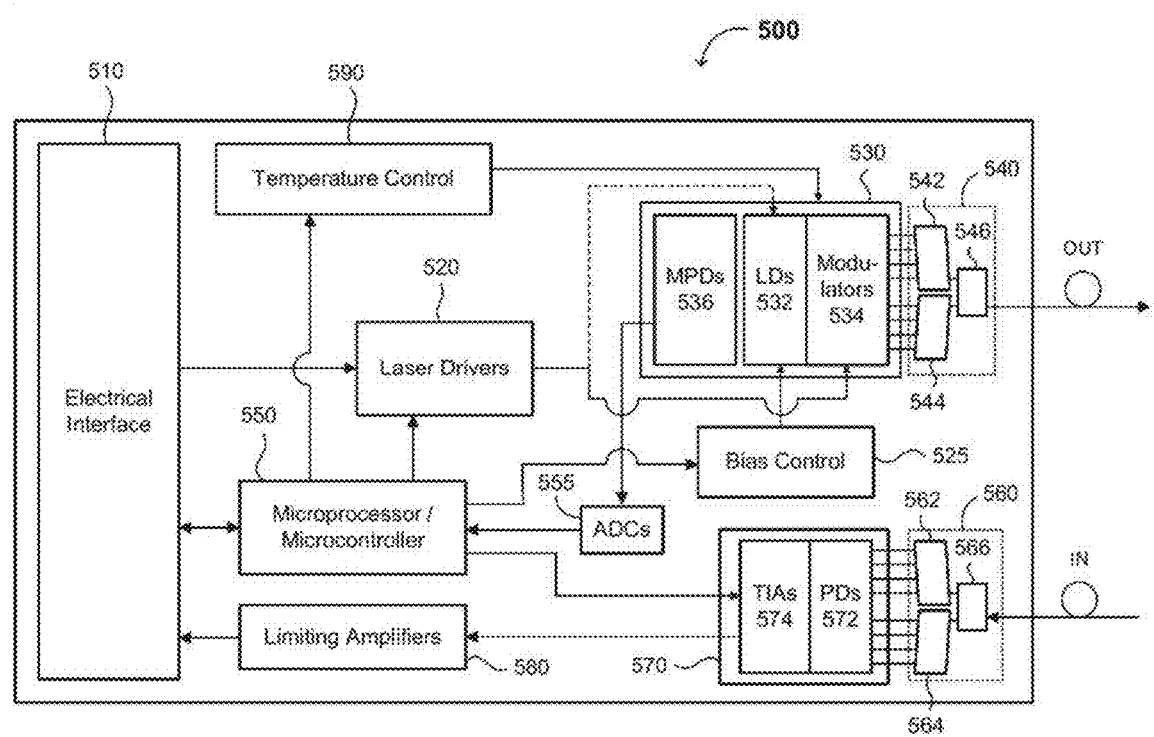

METHODS AND APPARATUSES FOR MULTIPLEXING AND DEMULTIPLEXING OPTICAL SIGNALS CONFIGURED TO SUPPRESS THE FOUR-WAVE MIXING EFFECT

FIELD OF THE INVENTION

The present invention relates to the field of optical communication, especially to optical multiplexers and demultiplexers, optical or optoelectronic transmitters, receivers and transceivers including the same, and methods of making and using the same.

DISCUSSION OF THE BACKGROUND

In optical communications, optical signals carry information. For example, a transmitter (e.g., a laser or laser diode) in an optical or optoelectronic transceiver converts one or more electrical signals into optical signals, and a receiver (e.g., a photodiode) in an optical or optoelectronic transceiver converts one or more optical signals into electrical signals. One objective of optical communication research and development is to increase and/or maximize bandwidth (e.g., the amount of information transmitted) to the greatest extent possible.

At a given baud rate, the capacity of a transmitter or receiver in an optical transceiver is limited by the number of optical channels (or wavelengths for wavelength division multiplexing [WDM] systems) that one transmitter optical subassembly (TOSA) or receiver optical subassembly (ROSA) can contain. When conventional optical components are used to multiplex (mux) and/or demultiplex (demux) a multi-channel optical signal, a minimal size (e.g., compactness) and reliability are primary concerns about the system processing such signals.

In a WDM system, the most direct way to improve the transmission capacity of the system is to reduce the spacing of the channels being multiplexed. Techniques to do so include, for example, fine wavelength division multiplexing (e.g., LWDM or nLWDM), dense WDM (DWDM), etc. However, the increase in power and the decrease in channel spacing will exacerbate the four-wave mixing (FWM) effect between channels, especially in some fibers with low dispersion and high nonlinearity. Four-wave mixing refers to the interaction(s) between two or three light waves to generate one or more new light waves at one or more frequencies different from those of the channels in the WDM system. This phenomenon may cause signal energy to be lost and may result in signal distortion.

When the channel spacing is relatively small, the phase matching conditions are easier to meet, and a large amount of power may be converted into a new light field (e.g., a different wavelength/frequency, a different beam shape, and/or a different propagation characteristic/property) by mixing four light waves. In the case of equal channel spacing, the new frequency noise resulting from FWM will directly coincide with the signal frequency in at least one of the channels, making crosstalk a more serious problem. The intensity of four-wave mixing is affected by the incident power, the nonlinear parameters of the fiber, the zero dispersion displacement point, and the polarization mode dispersion.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Among the methods that can be used to suppress FWM, polarization multiplexing is relatively convenient to implement. The principle is that the efficiency of FWM is proportional to the scalar product of the polarization vector of the mixed light wave, so the FWM effect is minimal when the optical wave of each channel is quadrature polarized (e.g., either S-polarized or P-polarized) in the WDM system. The present invention thus concerns an apparatus and method that implements optical paths in a manner that suppresses the four-wave mixing effect according to this principle.

The present invention is intended to overcome one or more deficiencies in the prior art, and provide an optical multiplexer, comprising a first beam combiner, a second beam combiner, and a polarizing beam combiner. The first beam combiner comprises a first reflective surface and a first filter, and is configured to combine first and second optical signals into a first multi-channel polarized optical signal. The first optical signal has a first polarization state and a first wavelength, and the second optical signal has the first polarization state and a second wavelength. The first filter reflects the first optical signal and allows the second optical signal to pass through. The second beam combiner comprises a second reflective surface and a second filter, and is configured to combine third and fourth optical signals into a second multi-channel polarized optical signal. The third optical signal has a second polarization state and a third wavelength, and the fourth optical signal has the second polarization state and a fourth wavelength. The second filter reflects the third optical signal and allows the fourth optical signal to pass through. The polarizing beam combiner comprises a third reflective surface and a polarization filter, and is configured to combine the first and second multi-channel polarized optical signals into a multi-channel output signal. The polarization filter comprises a polarization state-dependent filter configured to reflect the first multi-channel polarized optical signal and allow the second multi-channel polarized optical signal to pass through, and the third reflective surface comprises a first non-selective mirror configured to reflect the first multi-channel polarized optical signal towards the polarization state-dependent filter.

In the present optical multiplexer, all of the optical signals have different wavelengths. For example, each of the optical signals may have a wavelength that differs from a wavelength of an adjacent one of the optical signals by at least 0.4 nm, at least 1 nm, at least 2 nm, or any other value≥0.4 nm.

In further embodiments, the optical multiplexer further comprises one or more optical isolators in an optical path of at least one of the first multi-channel polarized optical signal, the second multi-channel polarized optical signal, and the multi-channel output signal. The optical isolator(s) are configured to isolate reflected light of the multi-channel signal passing through the optical isolator. In other or even further embodiments, the first beam combiner further comprises a first antireflective sheet or plate on a same side of the first beam combiner as the first filter, and the second beam combiner further comprises a second antireflective sheet or plate on a same side of the second beam combiner as the second filter.

In various embodiments, the first beam combiner comprises a first parallelepiped-shaped block, the second beam combiner comprises a second parallelepiped-shaped block. In such embodiments, the first reflective surface and the first filter may be on opposite sides of the first parallelepiped-shaped block, and the second reflective surface and the second filter may be on opposite sides of the second parallelepiped-shaped block. In some embodiments, the polarizing beam combiner comprises a third parallelepiped-shaped block. In such embodiments, the first non-selective mirror may be on a first surface of the third parallelepiped-shaped block, and the polarization state-dependent filter may be on a second surface of the third parallelepiped-shaped block parallel to the first surface of the third parallelepiped-shaped block.

In some embodiments, the optical multiplexer may further comprise first and second half-waveplates, respectively configured to change an initial polarization state of (i) the first and second optical signals to the first polarization state or (ii) the third and fourth optical signals to the second polarization state. For example, if all of the first through fourth optical signals have the same polarization state (e.g., S or P) when generated, the polarization state of half of the optical signals must change for polarization multiplexing (e.g., use of quadrature-polarized signals) to be effective.

The present optical multiplexer can be extended to larger systems, having a larger number of channels. For example, the first beam combiner may further comprise a third filter and a fourth filter, and be further configured to combine a fifth optical signal and a sixth optical signal with the first and second optical signals into the first multi-channel polarized optical signal. In this case, the fifth optical signal has the first polarization state and a fifth wavelength, and the sixth optical signal has the first polarization state and a sixth wavelength. The third filter may reflect the first and second optical signals and allow the fifth optical signal to pass through, and the fourth filter may reflect the first, second and fifth optical signals and allow the sixth optical signal to pass through. In addition, the second beam combiner may further comprise a fifth filter and a sixth filter, and be further configured to combine a seventh optical signal and an eighth optical signal with the third and fourth optical signals into the second multi-channel polarized optical signal. The seventh optical signal has the second polarization state and a seventh wavelength, and the eighth optical signal has the second polarization state and an eighth wavelength. The fifth filter may reflect the third and fourth optical signals and allow the seventh optical signal to pass through, and the sixth filter may reflect the third, fourth and seventh optical signals and allow the eighth optical signal to pass through.

In the optical multiplexer having a larger number of channels, the first reflective surface may be on a first side of the first beam combiner (e.g., the first parallelepiped-shaped block) nearest to the polarizing beam combiner, and the first, third and fourth filters may be on a second side of the first beam combiner (e.g., the first parallelepiped-shaped block) farthest from the polarizing beam combiner. Similarly, the second reflective surface may be on a first side of the second beam combiner (e.g., the second parallelepiped-shaped block) nearest to the polarizing beam combiner, and the second, fifth and sixth filters may be on a second side of the second beam combiner (e.g., the second parallelepiped-shaped block) farthest from the polarizing beam combiner.

Further embodiments of the optical multiplexer having a larger number of channels may further comprise first, second, third and fourth half-waveplates, respectively configured to change an initial polarization state of (i) the first, second, fifth and sixth optical signals to the first polarization state or (ii) the third, fourth, seventh and eighth optical signals to the second polarization state.

The present invention also relates to an optical transmitter, comprising the present optical multiplexer, a plurality of light sources (e.g., optical or optoelectronic transmitters, such as laser diodes) configured to provide the first, second, third and fourth optical signals, a plurality of lenses through which (i) the first and second optical signals pass before entering the first beam combiner and (ii) the third and fourth optical signals pass before entering the second beam combiner, and a package or housing including the optical multiplexer, the light sources, and lenses. The optical transmitter may further comprise a fiber adapter or connector configured to receive an optical fiber, in which case the optical fiber generally receives the multi-channel output signal from the optical multiplexer, and/or first and second half-waveplates, respectively configured to change an initial polarization state of (i) the first and second optical signals to the first polarization state or (ii) the third and fourth optical signals to the second polarization state. In the latter case, each of the plurality of light sources may be on a single substrate, and thus, may emit light having the same polarization state.

Another aspect of the present invention relates to an optical transceiver, comprising the present optical transmitter, an optical demultiplexer configured to separate an incoming multi-channel optical signal into a first, second, third and fourth received optical signals, and a plurality of photodetectors configured to convert the first, second, third and fourth received optical signals to first, second, third and fourth received electrical signals. The first received optical signal may have the first polarization state and the first wavelength, the second received optical signal may have the first polarization state and the second wavelength, the third received optical signal may have the second polarization state and the third wavelength, and the fourth multi-channel polarized optical signal may have the second polarization state and the fourth wavelength.

In some embodiments of the optical transceiver, the optical demultiplexer may comprise a polarizing beam splitter, a first beam separator and a second beam separator. The polarizing beam splitter may comprise a polarization filter and a first reflective surface, and be configured to separate a multi-channel optical input signal into first and second multi-channel polarized optical signals. The first beam separator may comprise a second reflective surface and a first filter, and be configured to separate the first multi-channel polarized optical signal into first and second optical signals. The first optical signal may have a first polarization state and a first wavelength, and the second optical signal may have the first polarization state and a second wavelength. The second beam separator may comprise a third reflective surface and a second filter, and be configured to separate the second multi-channel polarized optical signal into third and fourth optical signals. The third optical signal may have a second polarization state and a third wavelength, and the fourth optical signal may have the second polarization state and a fourth wavelength.

In other or further embodiments, the optical transceiver may further comprise a plurality of laser drivers configured to send data driving signals to the plurality of light sources, a plurality of amplifiers configured to amplify the first, second, third and fourth received electrical signals, an electrical interface configured to receive data signals corresponding to the data driving signals from an external device and to provide the amplified first, second, third and fourth received electrical signals to the external device, and a microprocessor or microcontroller configured to control the laser drivers and the amplifiers, and receive instructions and configuration information through the electrical interface. The optical transceiver may also further comprise a bias control circuit configured to apply a bias voltage to the light sources (e.g., laser diodes), a temperature control circuit or loop configured to regulate a temperature of the light sources, and monitoring photodiodes configured to determine a signal strength of the optical signals. The microprocessor or microcontroller may be further configured to control these additional components in the optical transceiver.

Yet another aspect of the present invention concerns an optical demultiplexer, comprising a polarizing beam splitter, a first beam separator and a second beam separator. The polarizing beam splitter comprises a polarization filter and a first reflective surface. The polarizing beam splitter is configured to separate a multi-channel optical input signal into first and second multi-channel polarized optical signals. The first beam separator comprises a second reflective surface and a first filter, and is configured to separate the first multi-channel polarized optical signal into first and second optical signals. The first optical signal has a first polarization state and a first wavelength, and the second optical signal has the first polarization state and a second wavelength. The second beam separator comprises a third reflective surface and a second filter, and is configured to separate the second multi-channel polarized optical signal into third and fourth optical signals. The third optical signal has a second polarization state and a third wavelength, and the fourth optical signal has the second polarization state and a fourth wavelength.

In various embodiments of the optical demultiplexer, the polarization filter may comprise a polarization state-dependent filter configured to reflect the first multi-channel polarized optical signal and allow the second multi-channel polarized optical signal to pass through, the first reflective surface may comprise a first non-selective reflective surface configured to reflect the first multi-channel polarized optical signal towards the first beam separator, the second reflective surface may be on a side of the first beam separator nearest to the polarizing beam splitter, the first filter may be on a side of the first beam separator farthest from the polarizing beam splitter, the third reflective surface may be on a side of the second beam separator nearest to the polarizing beam splitter, and the second filter may be on a side of the second beam separator farthest from the polarizing beam splitter.

In addition to polarization multiplexing and quadrature polarization of the optical signal in each channel, the present optical multiplexer and demultiplexer may also employ unequal channel spacing, phase conjugation, dispersion management, and other methods to suppress FWM. These and other advantages of the present invention will become readily apparent from the detailed description of various embodiments below.

BRIEF DESCRIPTION OF THE DRAWINGS

FIG. 1 is a block diagram showing an exemplary four-signal embodiment of an optical multiplexer, in accordance with the present invention.

FIG. 2 is a block diagram showing an alternative four-signal optical multiplexer, in accordance with the present invention.

FIG. 3 is a block diagram showing an exemplary eight-signal optical multiplexer, in accordance with the present invention.

FIG. 4 is a block diagram showing one or more alternative eight-signal optical multiplexers, in accordance with the present invention.

FIG. 5 is a diagram showing an exemplary optical transmitter in accordance with one or more embodiments of the present invention.

FIG. 6 is a diagram showing an exemplary optical demultiplexer in accordance with one or more embodiments of the present invention.

FIG. 7 is a diagram showing components in an exemplary optoelectronic transceiver and/or module in accordance with embodiments of the present invention.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components and circuits have not been described in detail so as not to unnecessarily obscure aspects of the disclosure.

Some portions of the detailed descriptions which follow are presented in terms of processes, procedures, logic, functions and other symbolic representations of operations on signals, code, data bits or data streams within a computer, transceiver, processor, controller and/or memory. These descriptions and representations are generally used by those skilled in the data processing arts to effectively convey the substance of their work to others skilled in the art. A process, procedure, logic operation, function, process, etc., is herein, and is generally, considered to be a step or a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and/or otherwise manipulated in a computer, data processing system, optical component, or circuit. It has proven convenient at times, principally for reasons of common usage, to refer to these signals as bits, streams, values, elements, symbols, characters, terms, numbers, information or the like. It should be borne in mind, however, that all of these and similar terms are associated with the appropriate physical quantities and/or signals, and are merely convenient labels applied to these quantities and/or signals.

Unless specifically stated otherwise, or as will be apparent from the following discussions, it is appreciated that throughout the present application, discussions utilizing terms such as "processing," "operating," "calculating," "determining," or the like, refer to the action and processes of a computer, data processing system, or similar processing device (e.g., an electrical, optical, or quantum computing or processing device or circuit) that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data or information similarly represented as physical quantities within other components of the same or a different system or architecture.

Furthermore, in the context of this application, the terms "signal" and "optical signal" refer to any known structure, construction, arrangement, technique, method and/or process for physically transferring data or information from one point to another. The term "wavelength" may refer to a center wavelength of light in a wavelength band, which may be relatively narrow and which generally does not overlap significantly with light having a different wavelength (i.e., a center wavelength in a different wavelength band). Also, unless indicated otherwise from the context of its use herein, the terms "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use. Similarly, for convenience and simplicity, the terms "time," "rate," "period" and "frequency" are, in general, interchangeable and may be used interchangeably herein, as are the terms "data," "bits," and "information," but these terms are generally given their art-recognized meanings.

For the sake of convenience and simplicity, the terms "optical" and "optoelectronic" are generally used interchangeably herein, and use of either of these terms also includes the other, unless the context clearly indicates otherwise, but these terms are generally given their art-recognized meanings herein. Furthermore, the term "transceiver" refers to a device having at least one receiver and at least one transmitter, and use of the term "transceiver" also includes the individual terms "receiver" and/or "transmitter," unless the context clearly indicates otherwise. Also, for convenience and simplicity, the terms "connected to," "coupled with," "communicating with," "coupled to," and grammatical variations thereof (which terms also refer to direct and/or indirect relationships between the connected, coupled and/or communicating elements unless the context of the term's use unambiguously indicates otherwise) may be used interchangeably, but these terms are also generally given their art-recognized meanings.

Various embodiments and/or examples disclosed herein may be combined with other embodiments and/or examples, as long as such a combination is not explicitly disclosed herein as being unfavorable, undesirable or disadvantageous. The invention, in its various aspects, will be explained in greater detail below with regard to exemplary embodiments.

An Exemplary Optical Multiplexer

FIG. 1 shows an exemplary optical multiplexer 100 that includes a first beam combiner 110, a second beam combiner 120, a polarizing beam combiner 130, and an optical isolator 140. The first beam combiner 110 combines first and fourth optical (light) signals 101 and 104, respectively having first and fourth wavelengths and signal strengths, to output a first combined signal 105. The second beam combiner 120 combines second and third optical signals 102 and 103, respectively having second and third wavelengths and signal strengths, to output a second combined signal 106. The first and fourth optical signals 101 and 104 (and thus the first combined signal 105) have one of two polarization types (e.g., S or P), and the second and third optical signals 102 and 103 (and thus the second combined signal 106) has the other of the two polarization types.

The exemplary multiplexer 100 implements a polarization beam combination method, Beams or signals having the same polarization state are combined through a set of filters (e.g., those on or in the first beam combiner 110), and beams or signals having a polarization state different from those combined by the first set of filters but the same as each other are combined through a different set of filters (e.g., those on or in the second beam combiner 120). The combined beams or signals having different polarization states are combined by reverse polarizing beam splitting (PBS), thereby achieving polarization multiplexing.

Using the four-channel system 100 in FIG. 1 as an example, the channel order is CH1 (signal 101), CH2 (signal 102), CH3 (signal 103), and CH4 (signal 104). CH1 may have the smallest wavelength, with the wavelengths of CH2, CH3, and CH4 successively increasing, in some embodiments by a constant or substantially constant increment or amount (e.g., 1.2-3.5 nm, depending on the applicable optical communications standard or protocol). There are generally two polarization states (e.g., S or vertical polarization, and P or horizontal polarization). To suppress four-wave mixing, the polarization states of the four channels should allow two channels having P or horizontal polarization to be shared by one channel having S or vertical polarization (or vice versa; i.e., two channels having S or vertical polarization be shared by one channel having P or horizontal polarization). In other words, when the signals are in order by wavelength, no signal is adjacent only to signals having the same polarization state, Thus, for example, the four channels may have, in sequence by wavelength, SPPS or PSSP polarization states. Alternatively, the four channels may have, in sequence by wavelength, SPSP or PSPS polarization states, but may not have SSPP or PPSS polarization states. The exemplary multiplexer 100 implements polarization multiplexing by combining the first and fourth channels CH1 and CH4 with the same polarization state (e.g., S) through a first set of filters (e.g., those on or in the first beam combiner 110), the second and third channels CH2 and CH3 with the same polarization state (e.g., P) through another set of filters (e.g., those on or in the second beam combiner 120), and then using reverse PBS to combine the optical signals with two perpendicular polarization states with each other.

The polarizing beam combiner 130 combines the first and second combined signals 105 and 106 to form a four-wave output signal 107. The isolator 140 isolates the light of the output signal 107 reflected from downstream devices, thereby reducing the influence of such reflected light on the light source (e.g., an emitter, such as a light-emitting diode or a laser; not shown). Both the polarizing beam combiner 130 and the isolator 140 are positioned at angles relative to the incoming light signal(s) to minimize or avoid reflections of the incoming light signal(s) back towards the light source.

The first and second beam combiners 110 and 120 comprise a block of material (e.g., glass) that is substantially transparent at the wavelengths of the respective optical signals 101 and 104 or 102 and 103. Each of the first and second beam combiners 110 and 120 may include a respective coating or surface 116 and 126 (e.g., a mirror) that totally reflects the first and third optical signals 101 and 103, respectively. Alternatively, the first and third optical signals 101 and 103 may be reflected by the interface between the first and second beam combiners 110 and 120 and the external medium (e.g., air or an inert gas). In a further alternative, the first and second beam combiners 110 and 120 may comprise a frame with a parallelepiped shape, in which 2 or 4 of the faces may be square or rectangular, with a hollow or unfilled interior space through which the optical signals pass. A separate plate or block 116 and 126 having a reflective surface facing the interior space of the respective first or second beam combiner 110 or 120 may be secured to the frame (e.g., with an adhesive).

The first beam combiner 110 has a first antireflective (AR) sheet or plate 112 secured thereto, which is substantially transparent at the wavelength of the first optical signal 101, but which is configured to minimize reflections of the first optical signal 101 back towards the light source (not shown). In some embodiments, the first AR sheet or plate 112 comprises an AR coating on glass or another transparent medium, such as a polycarbonate, and may further comprise a filter coating (e.g., a functional film that allows the first optical signal 101 to pass through, but which substantially blocks light having a different polarization or a wavelength that differs from that of the first optical signal 101 by x nm or more, where x is 2, 3, 4, 5 or more). The filter coating may be on the first AR sheet or plate 112 or on the surface of the first beam combiner 110 when the first beam combiner 110 is a solid block of material. The first beam combiner 110 also has a first filter 114 thereon. The first AR sheet or plate 112 and the first filter 114 may be secured to the first beam combiner 110, for example, with an adhesive. One of the surfaces of the first filter 114 and the first beam combiner 110 in contact with the other is coated with a second functional film 118 that reflects the first optical signal 101 and transmits the fourth optical signal 104. The second functional film 118 may have wavelength-dependent transmission and reflection properties similar to those of the filter coating on the first AR sheet or plate 112, but for different wavelengths. The fourth optical signal 104 is refracted and the first optical signal 101 is reflected at the same angle by the second functional film 118. Thus, the second functional film 118 functions as the beam combining surface in the first beam combiner 110. The surface of the first beam combiner 110 through which the first combined signal 105 passes may be coated with a first AR film.

The second beam combiner 120 may be substantially similar or identical to the first beam combiner 110, except that it is configured to combine the second and third optical signals 102 and 103, which have different wavelengths and polarization types than the first and fourth optical signals 102 and 104. Thus, the second beam combiner 120 has a second antireflective (AR) sheet or plate 122 secured thereto, which is substantially transparent at the wavelength of the third optical signal 103, but which is configured to minimize reflections of the third optical signal 103 back towards the corresponding light source (not shown). The second beam combiner 120 also has a second filter 124 thereon. One of the surfaces of the second filter 124 and the second beam combiner 120 in contact with the other is coated with a third functional film 128 that reflects the third optical signal 103 and transmits the second optical signal 102. The third optical signal 103 is reflected and the second optical signal 102 is refracted at the same angle by the third functional film 128. Thus, the third functional film 128 functions as the beam combining surface in the second beam combiner 120. The surface of the second beam combiner 120 through which the second combined signal 106 passes may be coated with a second AR film.

Among the optical signals 101-104 in the exemplary four-channel system, the polarization state of the first optical signal 101 and the fourth optical signal 104 is the same (e.g., S), the polarization state of the second optical signal 102 and the third optical signal 103 2 and 3 is the same (e.g., P), and the polarization directions of the first combined signal 105 and the second combined signal 106 are perpendicular. The polarization states of the optical signals 101-104 can be achieved by polarization (e.g., passing the signal through a polarizer, not shown) or by directly controlling the output of a laser emitting the optical signal.

The polarizing beam combiner 130 comprises a reflection block 132, a transmission block or space 134 with a parallelepiped shape, in which 2 or 4 of the faces may be square or rectangular (similar to the first and second beam combiners 110 and 120), and a filter block 136. In some embodiments, one or both of the surfaces of the reflection block 132 and the transmission block or space 134 in contact with each other reflect the incident light of the first combined optical signal 105. Alternatively, the transmission block or space 134 may comprise a frame with openings in the sidewalls (e.g., for the optical signals to pass through) and an open interior space. In this case, the surface of the reflection block 132 facing the interior of the transmission block or space 134 may totally reflect the first combined optical signal 105.

In some embodiments, one or both of the surfaces of the transmission block or space 134 and the filter block 132 in contact with each other includes a polarization-dependent film that reflects light having the same polarization state as the first combined optical signal 105 (e.g., S) and transmits light having the same polarization state as the second optical signal 106 (e.g., P). The polarization-dependent film at the interface between the transmission block or space 134 and the filter block 132 combines the first and second combined optical signals 105 and 106, resulting in formation of the four-channel optical signal 107 (having respective polarization states of SPPS) by polarization multiplexing.

An alternative optical multiplexer 100' is shown in FIG. 2. The multiplexer 100' includes the first beam combiner 110, the second beam combiner 120, and the polarizing beam combiner 130, similarly or identically to the optical multiplexer 100 of FIG. 1. Thus, the same identification numbers in different figures refer to the same or substantially the same structure. However, the optical isolator 140 in FIG. 1 is replaced with first and second optical isolators 142 and 144. The first optical isolator 142 is between the first beam combiner 110 and the polarizing beam combiner 130, and the second optical isolator 144 is between the second beam combiner 120 and the polarizing beam combiner 130. Each of the surfaces of the first and second optical isolators 142 and 144 respectively facing the first and second beam combiners 110 and 120 may have an AR coating thereon, in addition or as an alternative to the AR coating(s) on the polarizing beam combiner 130.

FIG. 3 shows an alternative eight-channel optical multiplexer 200, including a first beam combiner 210, a second beam combiner 220, a polarizing beam combiner 230, and an optical isolator 240. The first beam combiner 210 combines first, fourth, fifth and eighth optical (light) signals 201, 204, 205 and 208, respectively having first, fourth, fifth and eighth wavelengths and signal strengths, to output a first combined polarized signal 215. The second beam combiner 220 combines second, third, sixth and seventh optical signals 202, 203, 206 and 207 respectively having second, third, sixth and seventh wavelengths and signal strengths, to output a second combined polarized signal 225. The first, fourth, fifth and eighth optical signals 201, 204, 205 and 208 (and thus the first combined polarized signal 215) have one of the two polarization types (e.g., S or P), and the second, third, sixth and seventh optical signals 202, 203, 206 and 207 (and thus the second combined polarized signal 225) has the other of the two polarization types.

The wavelengths of the optical signals 201-208 may increase or decrease in successive order. For example, the first optical signal 201 may have the shortest wavelength, in which case the eighth optical signal 208 has the longest wavelength, and the second through seventh optical signals 202-207 have successively increasing wavelengths greater than that of the first optical signal 201, but less than that of the eighth optical signal 208. Alternatively, the first optical signal 201 may have the longest wavelength, in which case the eighth optical signal 208 has the shortest wavelength, and the second through seventh optical signals 202-207 have successively decreasing wavelengths less than that of the first optical signal 201, but greater than that of the eighth optical signal 208.

The optical multiplexer 200 in FIG. 3 has substantially the same advantages as the multiplexers 100 and 100' in FIGS. 1-2, in that it suppresses four-wave mixing by arranging the eight channels so that pairs of channels having P or horizontal polarization are shared by one channel having S or vertical polarization. In the arrangement described in the preceding paragraph, the wavelengths and polarization types of the eight optical signals 201-208 in the respective channels are described in Table 1 below.

TABLE 1

| Channel | Signal | Wavelength | Polarization |
|---------|--------|------------|--------------|
| CH0 | 201 | $\lambda$ | X |
| CH1 | 202 | $\lambda \pm \delta$ | Y |
| CH2 | 203 | $\lambda \pm 2\delta$ | Y |
| CH3 | 204 | $\lambda \pm 3\delta$ | X |
| CH4 | 205 | $\lambda \pm 4\delta$ | X |
| CH5 | 206 | $\lambda \pm 5\delta$ | Y |
| CH6 | 207 | $\lambda \pm 6\delta$ | Y |
| CH7 | 208 | $\lambda \pm 7\delta$ | X | where $\delta$ is the difference between the wavelengths of the first and second channels (and $\delta$ may increase slightly [typically by not more than 5-10%] as the channel number increases), X is one of two polarization types (e.g., S or P), and Y is the other of the two polarization types.

Each of the first and second beam combiners 210 and 220 may include an AR sheet or plate 252 and 262 respectively thereon. The AR sheets or plates 252 and 262 are similar or identical to the AR sheets or plates 112 and 122 in FIGS. 1-2. The first beam combiner 210 (FIG. 3) also includes a coating or surface 212 that totally reflects the first optical signal 101, a first combined signal 211, and a second combined signal 213. The second beam combiner 220 also includes a similar coating or surface 222 that totally reflects the seventh optical signal 207, a third combined signal 221, and a fourth combined signal 223. The coatings or surfaces 212 and 222 are similar or identical to the coatings or surfaces 116 and 126 in FIGS. 1-2.

Referring back to FIG. 3, the first beam combiner 210 also has a first filter 254, a second filter 256, a third filter 258, a first functional film 214, a second functional film 216, and a third functional film 218 thereon. The first functional film 214 reflects the first optical signal 201 and transmits the fourth optical signal 204. The fourth optical signal 204 is refracted and the first optical signal 201 is reflected at the same angle by the first functional film 214. The fourth optical signal 204 is refracted and the first optical signal 201 is reflected at the same angle by the first functional film 214 to form the first combined signal 211. Similarly, the second functional film 216 reflects the first combined signal 211 and refracts (transmits) the fifth optical signal 205 at the same angle to form the second combined signal 213, and the third functional film 218 reflects the second combined signal 213 and refracts (transmits) the eighth optical signal 208 at the same angle to form the first combined polarized signal 215. Thus, the first, second and third functional films 214, 216 and 218 function as the beam combining surfaces in the first beam combiner 210.

The second beam combiner 220 may be substantially similar or identical to the first beam combiner 210, except that it is configured to combine the second, third, sixth and seventh optical signals 202, 203, 206 and 207, which have different wavelengths and polarization types than the first, fourth, fifth and eighth optical signals 201, 204, 205 and 208. Thus, the second beam combiner 220 has a second AR sheet or plate 262, fourth, fifth, and sixth filters 264, 266 and 268, and fourth, fifth, and sixth functional films 224, 226 and 228 thereon. The fourth, fifth, and sixth functional films 224, 226 and 228 respectively (i) reflect the seventh optical signal 207 and transmit the sixth optical signal 206 to form a third combined optical signal 221, (i) reflect the third combined optical signal 221 and transmit the third optical signal 203 to form a fourth combined optical signal 223, and (iii) reflect the fourth combined optical signal 223 and transmit the second optical signal 202 to form the second combined polarized optical signal 225. Thus, the fourth, fifth, and sixth functional films 224, 226 and 228 function as the beam combining surfaces in the second beam combiner 220.

The polarizing beam combiner 230 and the optical isolator 240 in FIG. 3 are identical or substantially identical to the polarizing beam combiner 130 and the optical isolator 140 in FIG. 1. Thus, the present optical multiplexer is not limited to four-channel systems, and can be extended to higher-bandwidth applications in which the number of channels is 4 n or $2^p$, where n is an integer of 1 or more, and p is an integer of 2 or more.

In alternative arrangement to that described in Table 1 above, the wavelengths and polarization types of the eight optical signals 201-208 in the multiplexer 200 of FIG. 3 are described in Table 2 below.

TABLE 2

| Channel | Signal | Wavelength | Polarization |
|---------|--------|------------|--------------|
| CH0 | 201 | $\lambda$ | X |
| CH1 | 202 | $\lambda \pm \delta$ | Y |
| CH2 | 204 | $\lambda \pm 2\delta$ | X |
| CH3 | 203 | $\lambda \pm 3\delta$ | Y |
| CH4 | 205 | $\lambda \pm 4\delta$ | X |
| CH5 | 206 | $\lambda \pm 5\delta$ | Y |
| CH6 | 208 | $\lambda \pm 6\delta$ | X |
| CH7 | 207 | $\lambda \pm 7\delta$ | Y | where $\delta$, X, and Y are as described for Table 1. Other arrangements in which each of the two pairs of signals having a first one of two polarization states (e.g., P polarization) are shared by a signal having the other polarization state (e.g., S polarization, or vice versa) can be easily derived by those skilled in the art. In other words, a first pair of signals having the first polarization state is shared by a first signal having the other polarization state, and a second pair of signals having the first polarization state is shared by a second signal having the other polarization state. Similarly, a first pair of signals having the second polarization state is shared by a first signal having the first polarization state, and a second pair of signals having the second polarization state is shared by a second signal having the first polarization state. In some embodiments, both polarization state sharing conditions are true (i.e., each pair of signals having one polarization state are shared by a signal having the other polarization state, and the signal having the other polarization state is not shared with any other pair of signals having the one polarization state).

FIG. 4 shows an exemplary alternative eight-channel optical multiplexer 200' according to embodiments of the present invention. The optical multiplexer 200' is substantially the same as the optical multiplexer 200 in FIG. 3, but it further includes first through fourth half-waveplates 272, 274, 276 and 278. The half-waveplates 272, 274, 276 and 278 can convert S-polarized light to P-polarized light, or P-polarized light to S-polarized light. This greatly simplifies the design and manufacturing of the light sources (e.g., laser diodes), which can all produce light having the same polarization state, and as a consequence, can be manufactured monolithically (e.g., on a single substrate). As shown in FIG. 4, the half-waveplates 272, 274, 276 and 278 can be placed between the light source and the second beam combiner 220 (e.g., between the light source and the fifth and sixth filters 266 and 268, as shown) or directly on the AR sheet or plate and/or the filters (e.g., directly on the AR sheet or plate 262 and the fourth filter 264, as shown). The half-waveplates 272, 274, 276 and 278 may be secured to the AR sheet or plate and/or the filters using an adhesive.

Alternatively, when all of the light sources have the same polarization state, the half-waveplates 272, 274, 276 and 278 can be placed between the light source and the first beam combiner 210, or directly on the AR sheet or plate 252 and/or the first, second and third filters 254, 256 and 258. In a further alternative, the optical multiplexer 200' can include a single half-waveplate between (i) either the first beam combiner 210 or the second beam combiner 220 and (ii) the polarizing beam combiner 230, in substantially the same location as one of the first and second optical isolators 142 and 144 in FIG. 2.

An Exemplary Optical Transmitter

FIG. 5 shows an exemplary optical transmitter 300 including the exemplary optical multiplexer 200 of FIG. 3. In addition, the optical transmitter 300 includes light sources 310 and lenses 320. All of the components shown in the optical transmitter 300 of FIG. 3 may be contained within a housing or package (not shown), and the multi-channel output signal 245 may be focused through one or more additional lenses on a far field spot in an optical fiber (not shown). The optical fiber may be conventionally coupled and/or connected to the housing or package of the optical transmitter 300 (e.g., using a ferrule or similar connector).

The light sources 310 comprise a first light source block 315x including first through fourth light sources 311x-314x, and a second light source block 315y including fifth through eighth light sources 311y-314y. Typically, the first through fourth light sources 311x-314x in the first light source block 315x are on one substrate and emit light having a first polarization state, and the fifth through eighth light sources 311y-314y in the second light source block 315y are on another substrate and emit light having a second polarization state. However, as described with regard to FIG. 4, the light sources 310 may all be on a single substrate and emit light having the same polarization state, as long as the light from each light source in one of the light source blocks 315x and 315y has its polarization state changed (e.g., by passing through a half-waveplate).

Each of the first through eighth light sources 311x-314y typically comprises a laser diode configured to emit light within a relatively narrow band of light (e.g., having a full width at half maximum of ≤1 nm, or any value<1 nm), to maximize the number of channels within the wavelength band(s) permitted by the optical communication protocol or standard, and minimize the probability of cross-talk among the channels. Each of the laser diodes may comprise a vertical-cavity surface-emitting laser (VCSEL) diode, although the invention is not limited to such a laser source type. For example, the light sources 311x-314x and 311y-314y may be or comprise double heterostructure lasers, quantum well lasers, quantum cascade lasers, interband cascade lasers, separate confinement heterostructure lasers, distributed Bragg reflector lasers, distributed feedback lasers, vertical-external-cavity surface-emitting-lasers, or external-cavity diode lasers.

The lenses 320 are conventional, and may comprise ball lenses (e.g., as shown), convex and/or concave lenses (e.g., biconvex, biconcave, planoconvex, planoconcave, or meniscus [positive or negative] lenses), half-ball lenses, gratings, Fresnel lenses, etc. Each of the lenses 321-328 focuses a corresponding optical signal onto a focal point, typically on a reflective or refractive surface on a far side of the corresponding beam combiner 210 or 220. The transmitter 300 may include additional components in various optical paths, such as one or more additional lenses (e.g., in the optical paths of the first and second combined polarized signals 215 and 225, between the first and second beam combiners 210 and 220 and the polarizing beam combiner 230, and/or in the optical path of the multi-channel output signal 245, upstream and/or downstream from the optical isolator 240) and/or one or more bandpass and/or polarization filters.

An Exemplary Optical Demultiplexer

The principles behind the present optical multiplexer are also applicable to optical demultiplexers. FIG. 6 shows an exemplary optical demultiplexer 400 according to embodiments of the present invention, including a polarizing beam splitter (PBS) 450, a first beam separator 410, a second beam separator 420, and a plurality of lenses 431-438. The beam splitter 450 may comprise a structural block comprising a mirror 452 and a polarization filter 454, similar or identical to the beam combiners 130 and 230 in FIGS. 1-3. Thus, the polarization filter 454 reflects any light having one of two polarization states (e.g., S or P), and refracts or allows to pass through any light having the other polarization state. The mirror 452 is generally a total reflection mirror that reflects the light 419 having the one polarization state towards an input port of the first beam separator 410.

The first beam separator 410 includes a first plurality of filters 412, 414, 416 and 418 and a first mirror 460. The second beam separator 420 includes a second plurality of filters 422, 424, 426 and 428 and a second mirror 465. The filters 412, 414, 416, 418, 422, 424, 426 and 428 in the multiplexer 400 are generally wavelength-selective filters, and may comprise a separate component adhered or fixed onto the surface of the first or second beam separator 410 or 420, or a coating applied to the surface of the first or second beam separator 410 or 420, similar or identical to the first and second beam combiners 210 and 220 in FIG. 3. The filters 412 and 422 are optional, and can be or comprise a high bandpass filter and/or a low bandpass filter. The first and second mirrors 460 and 465 are non-selective or total reflectance mirrors, and cover at least the areas or locations where the optical signals 401, 415, 417, 405, 425 and 427 respectively impinge, but do not cover the area or location where the incoming 4-channel optical signals 419 and 429 respectively impinge (i.e., the input ports of the first and second beam separators 410 and 420).

The demultiplexer 400 operates similarly to the multiplexer 200 in FIG. 3A, but in reverse. An 8-channel optical signal 455 is separated into first and second 4-channel optical signals 419 and 429 by the filter 454 in the beam splitter 450. The first 4-channel optical signal 419, having signals with only the one polarization type, is reflected by the filter 454, and the second 4-channel optical signal 429, having signals with only the other polarization type, passes through the filter 454. The 4-channel optical signal 419 is then reflected by mirror 452, which is generally a non-selective mirror (i.e., it reflects substantially all of the signals in the first 4-channel optical signal 419), but in some embodiments, it may comprise a polarization-dependent filter (i.e., it reflects light having the one polarization type, but allows light having the other polarization type to pass through).

In the beam separators 410 and 420, the 4-channel optical signals 419 and 429 respectively impinge on the fourth and eighth filters 418 and 428. The fourth and eighth single-channel optical signals 404 and 408 pass through the fourth and eighth filters 418 and 428, but the signals 417 and 427 are respectively reflected by the fourth and eighth filters 418 and 428 towards the mirrors 460 and 465. The signals 417 and 427 include the remaining three channels of the 4-channel optical signals 419 and 429, respectively. The mirrors 460 and 465 reflect the signals 417 and 427 towards the third and seventh filters 416 and 426. The third and seventh optical signals 403 and 407 pass through the third and seventh filters 416 and 426, and the signals 415 and 425 are reflected. The signals 415 and 425 include the remaining two channels of the 3-channel optical signals 417 and 427, respectively. The mirrors 460 and 465 reflect the signals 415 and 425 towards the second and sixth filters 414 and 424, The first and fifth optical signals 401 and 405 are reflected by the second and sixth filters 414 and 424, but the second and sixth optical signals 402 and 406 respectively pass through the second and sixth filters 414 and 424. The first and fifth optical signals 401 and 405 are reflected by the mirrors 460 and 465 towards the optional first and fifth filters 412 and 422, where they pass through.

The first through eighth optical signals 401-408 from respective first through eighth filters 412, 414, 416, 418, 422, 424, 426 and 428 are focused and/or collimated by the first through eighth lenses 431-438 onto a corresponding one of first through eighth optical signal detectors (e.g., photodiodes, not shown). The first through eighth optical signals 401-408 have different wavelengths. There is a spacing between adjacent wavelengths of the signals 401-408 as described elsewhere herein. In addition, the demultiplexer 400 may include additional components in various optical paths, such as one or more additional lenses, bandpass filters and/or mirrors as described herein, but in a reverse or complementary configuration to those described for the optical multiplexers 100, 100', 200 and 200' in FIGS. 1-4.

An Exemplary Optical Transceiver and/or Optical Module

FIG. 7 is a diagram of an exemplary optical transceiver and/or optical module 500 in accordance with embodiments of the present invention comprises an electrical interface 510, one or more laser drivers 520, a transmitter optical subassembly (TOSA) 530, an optical multiplexer 540, a microprocessor or microcontroller (e.g., MCU) 550, an optical demultiplexer 560, a receiver optical subassembly (ROSA) 570 and a limiting amplifier 580 coupled in sequence, and a temperature control circuit 590. The TOSA 530 comprises a plurality of laser diodes (LDs) 532, a corresponding plurality of modulators 534 and a corresponding plurality of monitoring photodiodes (MPDs) 536. The ROSA 570 generally includes a plurality of photodiodes (PDs) 572 configured to receive optical signals from a network (e.g., sent over an optical fiber) and convert the optical signals to electrical signals, and optionally, one or more transimpedance amplifiers 574 configured to amplify the electrical signals. The limiting amplifiers 580 are configured to amplify the signals received from the ROSA 570.

In the transmitter path of the optical transceiver and/or module 500, the laser drivers 520 receive electrical data signals from the electrical interface 510 and send data driving signals or pulses to the modulators 534. The electrical interface 510 may receive the data signals from a host device and is conventional. The LDs 532 receive a bias signal or voltage from the bias control circuit 525. Alternatively, the LDs 532 may receive the data driving signals or pulses directly the laser drivers 520, in which case the modulators 534 may not be needed. The MPDs 536 are connected to the MCU 550 via one or more analog-to-digital converter (ADC) circuits or modules 555. Thus, the MCU 550 may receive a digital signal (e.g., a voltage) corresponding to the value of a feedback current from each of the MPDs 536, which may be useful for comparing to one or more thresholds or voltages representative of a target and/or maximum value of the operating range of the laser drivers 520. The MPDs 536, analog-to-digital converters 555, MCU 550 and laser drivers 520 may form a closed-loop automatic power control (APC) regulating loop for maintaining a target optical output power from the LDs 532.

The TOSA 530 (i.e., either the modulators 534 or the LDs 532) outputs a plurality of optical signals, half having one of the two polarization types and the other half having the other polarization type, that are combined by the optical multiplexer 540 as described herein with regard to FIGS. 1-4. The multiplexer 540 comprises first and second beam combiners 542 and 544 and a polarizing beam combiner 546, as described elsewhere herein. In further embodiments, the multiplexer 540 may further include a plurality of lenses as described herein, and the first and second beam combiners 542 and 544 may include respective first and second pluralities of filters and first and second mirrors, as described herein. The polarizing beam combiner 546 may comprise one or more mirrors and one or more polarization filters, as described herein.

As shown in FIG. 7, each of the first and second beam combiners 542 and 544 combine four optical signals having the same polarization state to create a four-channel polarized optical signal. The two four-channel polarized optical signals are then combined by the polarizing beam combiner 546 to form an eight-channel optical output signal. However, the first and second beam combiners 542 and 544 may combine a different number of optical signals, and the polarizing beam combiner 546 may output an optical signal having a different number of channels. Furthermore, the optical multiplexer 540 may further include one or more optical isolators and/or a plurality of half-waveplates as described herein.

In the receiver path of the optical transceiver and/or module 500, the optical demultiplexer 560 receives an incoming multi-channel optical signal. Like the optical demultiplexer 400 in FIG. 6, the optical demultiplexer 560 comprises a PBS 566 and first and second beam separators 562 and 564. In further embodiments, the demultiplexer 560 may further include a plurality of lenses as described with regard to FIG. 6, and the first and second beam separators 562 and 564 may include respective third and fourth pluralities of filters and third and fourth mirrors, as described with regard to FIG. 6. The PBS 566 may comprise one or more mirrors and one or more polarization filters, as described with regard to the optical demultiplexer 400 in FIG. 6.

As shown in FIG. 7, an eight-channel optical input signal is separated into two four-channel optical signals having different polarization states by the PBS 566. Each 4-channel polarized optical signal is then demultiplexed into individual optical signals by the first and second beam separators 562 and 564, as described herein. However, the PBS 566 may receive an optical signal having a different number of channels, and the first and second beam separators 562 and 564 may receive and demultiplex a different number of optical signals.

The PDs 572 receive the individual optical signals and convert them into electrical signals that are amplified by the TIAs 574. The amplified electrical signals output by the TIAs 574 may then be further amplified by the limiting amplifiers 580 prior to transmission by or from the electrical interface 510 (e.g., to the host).

The MCU 550 controls the power of the data signals from the laser drivers 520, the voltage or current of the bias signal provided by the bias control circuit 525, and the gain(s) of the TIAs 574 and/or limiting amplifiers 580. The MCU 550 also controls the temperature control circuit 590, which in turn controls the temperature of the LDs 532 and optionally the modulators 534. Generally, the temperature of the LDs 532 and the modulators 534 may be controlled by regulating the power supplied to them (e.g., when the temperature of the LDs 532 is too high, the bias from the bias control circuit may be reduced, and when the temperature of the LDs 532 is too low, the bias from the bias control circuit may be increased).

Exemplary Methods of Using an Optical Multiplexer or Optical Demultiplexer

Yet a further aspect of the present invention involves a method of forming a multi-channel optical output signal, comprising combining a first plurality of individual optical signals having the same one of two polarization states (e.g., S or P) into a first multi-channel polarized optical signal using a first beam combiner, combining a second plurality of individual optical signals having the other polarization state into a second multi-channel polarized optical signal using a second beam combiner, and combining the first and second multi-channel polarized optical signals into a third multi-channel optical signal using a using a polarizing beam combiner. The first beam combiner comprises at least one first mirror and at least one first filter, the second beam combiner comprises at least one second mirror and at least one second filter, and the beam combiner comprises one or more third mirrors and one or more third filters. The third multi-channel optical signal is, or is at least a component of, the multi-channel optical output signal. For example, the third multi-channel optical signal may be combined with one or more additional multi-channel optical signals before being output by the optical multiplexer.

In further embodiments, the first beam combiner may comprise a first parallelogram-shaped block. The first mirror(s) may be on a distal side of the first parallelogram-shaped block (i.e., away from the optical transmitters), and the first filter(s) may be on a near side of the first parallelogram-shaped block (i.e., nearer to the optical transmitters). Additionally or alternatively, the second beam combiner may comprise a second parallelogram-shaped block, in which case the second mirror(s) may be on a distal side of the second parallelogram-shaped block, and the second filter(s) are on a near side of the second parallelogram-shaped block. Furthermore, parallel sides of the first parallelogram-shaped block may be parallel or substantially parallel to parallel sides of the second parallelogram-shaped block.

In even further embodiments, combining the first plurality of individual optical signals comprises passing each of the first plurality of individual optical signals through a corresponding first filter and reflecting all but one of the first plurality of individual optical signals towards an adjacent first filter using the first mirror(s). Additionally or alternatively, combining the second plurality of individual optical signals may comprise passing each of the second plurality of individual optical signals through a corresponding second filter and reflecting all but one of the second plurality of individual optical signals towards an adjacent second filter using the second mirror(s).

In some embodiments, the beam combiner comprises a third parallelogram-shaped block, the third mirror(s) comprise a non-selective mirror on a first surface of the third parallelogram-shaped block, and the third filter(s) comprise a wavelength-dependent and/or polarization-dependent filter on a second surface of the third parallelogram-shaped block parallel to the first surface of the third parallelogram-shaped block. Furthermore, in general, the method may further comprise passing each of the first and second pluralities of individual optical signals through a corresponding lens before the first and second pluralities of individual optical signals enter the first and second beam combiners.

Alternatively, the present invention relates to a method of separating an incoming multi-channel optical output signal into its individual optical signals, comprising separating the incoming multi-channel optical signal into first and second multi-channel optical signals using a beam splitter comprising one or more mirrors and one or more filters, separating the first multi-channel optical signal into a first plurality of individual optical signals using a first beam combiner comprising at least one mirror and a plurality of filters, and separating the second multi-channel optical signal into a second plurality of individual optical signals using a second beam combiner comprising at least one mirror and a plurality of filters. The number of individual optical signals in the first and second pluralities of individual optical signals is the same as the number of channels in the incoming multi-channel optical signal.

Like the method of forming a multi-channel optical output signal, the first and second beam combiners may comprise respective first and second parallelogram-shaped blocks. However, the mirror(s) may be on a near side of the parallelogram-shaped block (i.e., away from the optical transmitters), the filter(s) may be on a distal side of the first parallelogram-shaped block (i.e., nearer to the optical transmitters), and parallel sides of the first parallelogram-shaped block may be parallel or substantially parallel to parallel sides of the second parallelogram-shaped block. In some embodiments, the beam splitter comprises a third parallelogram-shaped block, the third mirror(s) comprise a non-selective mirror on a first surface of the third parallelogram-shaped block, and the third filter(s) comprise a wavelength-dependent and/or polarization-dependent filter on a second surface of the third parallelogram-shaped block parallel to the first surface of the third parallelogram-shaped block.

In further embodiments, separating the first and/or second multi-channel optical signals into corresponding individual optical signals comprises passing one of the individual optical signals through a corresponding one of the filters in the beam combiner and reflecting the remaining individual optical signals towards the mirror(s), where the remaining individual optical signals are reflected towards an adjacent one of the filters. Optionally, the last remaining individual optical signal can be reflected to a corresponding last one of the optical signal detectors. Furthermore, in general, the method may further comprise passing each of the first and second pluralities of individual optical signals through a corresponding lens before the first and second pluralities of individual optical signals enter the first and second beam combiners.

CONCLUSION/SUMMARY

Embodiments of the present invention advantageously provide an optical multiplexer and demultiplexer, an optical transmitter including the optical multiplexer, and methods for using such optical multiplexers and demultiplexers. By sharing a signal having one polarization state among two signals having the other polarization state, and separately combining optical signals having the different polarization states, the present optical multiplexer reduces the four-beam mixing effect, relative to the prior art.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. An optical multiplexer, comprising:
a first beam combiner comprising a first reflective surface and a first filter, the first beam combiner being configured to combine a first optical signal and a second optical signal into a first multi-channel polarized optical signal, wherein the first optical signal has a first polarization state and a first wavelength, the second optical signal has the first polarization state and a second wavelength, and the first filter reflects the first optical signal and allows the second optical signal to pass through;
a second beam combiner comprising a second reflective surface and a second filter, the second beam combiner being configured to combine a third optical signal and a fourth optical signal into a second multi-channel polarized optical signal, wherein the third optical signal has a second polarization state and a third wavelength, the fourth optical signal has the second polarization state and a fourth wavelength, and the second filter reflects the third optical signal and allows the fourth optical signal to pass through;
first and second half-waveplates, respectively configured to change an initial polarization state of (i) the first and second optical signals to the first polarization state or (ii) the third and fourth optical signals to the second polarization state; and
a polarizing beam combiner comprising a third reflective surface and a polarization filter, the polarizing beam combiner being configured to combine the first and second multi-channel polarized optical signals into a multi-channel output signal.

2. The optical multiplexer of claim 1, further comprising an optical isolator in an optical path of an output signal selected from the first multi-channel polarized optical signal, the second multi-channel polarized optical signal, and the multi-channel output signal, configured to isolate reflected light of the output signal passing through the optical isolator.

3. The optical multiplexer of claim 1, wherein the first beam combiner comprises a first parallelepiped-shaped block, the second beam combiner comprises a second parallelepiped-shaped block.

4. The optical multiplexer of claim 3, wherein the first reflective surface and the first filter are on opposite sides of the first parallelepiped-shaped block, and the second reflective surface and the second filter are on opposite sides of the second parallelepiped-shaped block.

5. The optical multiplexer of claim 4, wherein the first beam combiner further comprises a first antireflective sheet or plate on a same side of the first parallelepiped-shaped block as the first filter, and the second beam combiner further comprises a second antireflective sheet or plate on a same side of the second parallelepiped-shaped block as the second filter.

6. The optical multiplexer of claim 1, wherein the polarizing beam combiner comprises a third parallelepiped-shaped block, the first non-selective mirror is on a first surface of the third parallelepiped-shaped block, and the polarization state-dependent filter is on a second surface of the third parallelepiped-shaped block parallel to the first surface of the third parallelepiped-shaped block.

7. The optical multiplexer of claim 1, wherein:
the first beam combiner further comprises a third filter and a fourth filter, the first beam combiner being further configured to combine a fifth optical signal and a sixth optical signal with the first and second optical signals into the first multi-channel polarized optical signal, wherein the fifth optical signal has the first polarization state and a fifth wavelength, the sixth optical signal has the first polarization state and a sixth wavelength, the third filter reflects the first and second optical signals and allows the fifth optical signal to pass through, and the fourth filter reflects the first, second and fifth optical signals and allows the sixth optical signal to pass through; and
the second beam combiner further comprises a fifth filter and a sixth filter, the second beam combiner being further configured to combine a seventh optical signal and an eighth optical signal with the third and fourth optical signals into the second multi-channel polarized optical signal, wherein the seventh optical signal has the second polarization state and a seventh wavelength, the eighth optical signal has the second polarization state and an eighth wavelength, the fifth filter reflects the third and fourth optical signals and allows the seventh optical signal to pass through, and the sixth filter reflects the third, fourth and seventh optical signals and allows the eighth optical signal to pass through.

8. The optical multiplexer of claim 7, wherein the first beam combiner comprises a first parallelepiped-shaped block, the second beam combiner comprises a second parallelepiped-shaped block.

9. The optical multiplexer of claim 8, wherein:
the first reflective surface is on a first side of the first parallelepiped-shaped block nearest to the polarizing beam combiner,
the first, third and fourth filters are on a second side of the first parallelepiped-shaped block farthest from the polarizing beam combiner,
the second reflective surface is on a first side of the second parallelepiped-shaped block nearest to the polarizing beam combiner, and
the second, fifth and sixth filters are on a second side of the second parallelepiped-shaped block farthest from the polarizing beam combiner.

10. The optical multiplexer of claim 8, further comprising third and fourth half-waveplates, respectively configured to change an initial polarization state of (i) the fifth and sixth optical signals to the first polarization state or (ii) the seventh and eighth optical signals to the second polarization state.

11. The optical multiplexer of claim 1, wherein each of the individual optical signals has a wavelength that differs from a wavelength of an adjacent one of the individual optical signals by at least 0.4 nm.

12. An optical transmitter, comprising:
the optical multiplexer of claim 1;
a plurality of light sources configured to provide the first, second, third and fourth optical signals;
a plurality of lenses through which the first and second optical signals pass before entering the first beam combiner, and through which the third and fourth optical signals pass before entering the second beam combiner; and
a package or housing including the optical multiplexer, the plurality of light sources, and the plurality of lenses.

13. The optical transmitter of claim 12, further comprising a fiber adapter or connector configured to receive an optical fiber, the optical fiber receiving the multi-channel output signal from the optical multiplexer.

14. An optical transceiver, comprising:
the optical transmitter of claim 12;
an optical demultiplexer configured to separate an incoming multi-channel optical signal into a first, second, third and fourth received optical signals, the first received optical signal having the first polarization state and the first wavelength, the second received optical signal having the first polarization state and the second wavelength, the third received optical signal having the second polarization state and the third wavelength, and the fourth received optical signal having the second polarization state and the fourth wavelength; and
a plurality of photodetectors configured to convert the first, second, third and fourth received optical signals to first, second, third and fourth received electrical signals.

15. The optical transceiver of claim 14, wherein the optical demultiplexer comprises:
a polarizing beam splitter comprising a polarization filter and a first reflective surface, the polarizing beam splitter being configured to separate a multi-channel optical input signal into first and second multi-channel polarized optical signals;
a first beam separator comprising a second reflective surface and a first filter, the first beam separator being configured to separate the first multi-channel polarized optical signal into first and second optical signals, the first optical signal having a first polarization state and a first wavelength, and the second optical signal having the first polarization state and a second wavelength; and
a second beam separator comprising a third reflective surface and a second filter, the second beam separator being configured to separate the second multi-channel polarized optical signal into third and fourth optical signals, the third optical signal having a second polarization state and a third wavelength, and the fourth optical signal having the second polarization state and a fourth wavelength.

16. The optical transceiver of claim 14, further comprising:
a plurality of laser drivers configured to send data driving signals to the plurality of light sources,
a plurality of amplifiers configured to amplify the first, second, third and fourth received electrical signals,
an electrical interface configured to receive data signals corresponding to the data driving signals from an external device and to provide the amplified first, second, third and fourth received electrical signals to the external device, and
a microprocessor or microcontroller configured to control the plurality of laser drivers and the plurality of amplifiers, and receive instructions and configuration information through the electrical interface.

17. An optical multiplexer, comprising:
a first beam combiner comprising a first parallelepiped-shaped block having a first reflective surface, a first filter and a first antireflective sheet or plate on a same side of the first parallelepiped-shaped block as the first filter, the first beam combiner being configured to combine a first optical signal and a second optical signal into a first multi-channel polarized optical signal, wherein the first optical signal has a first polarization state and a first wavelength, the second optical signal has the first polarization state and a second wavelength, the first filter reflects the first optical signal and allows the second optical signal to pass through, and the first reflective surface and the first filter are on opposite sides of the first parallelepiped-shaped block;
a second beam combiner comprising a second parallelepiped-shaped block having a second reflective surface, a second filter and a second antireflective sheet or plate on a same side of the second parallelepiped-shaped block as the second filter, the second beam combiner being configured to combine a third optical signal and a fourth optical signal into a second multi-channel polarized optical signal, wherein the third optical signal has a second polarization state and a third wavelength, the fourth optical signal has the second polarization state and a fourth wavelength, the second filter reflects the third optical signal and allows the fourth optical signal to pass through, and the second reflective surface and the second filter are on opposite sides of the second parallelepiped-shaped block; and
a polarizing beam combiner comprising a third reflective surface and a polarization filter, the polarizing beam combiner being configured to combine the first and second multi-channel polarized optical signals into a multi-channel output signal.

18. An optical transmitter, comprising:
the optical multiplexer of claim 17;
a plurality of light sources configured to provide the first, second, third and fourth optical signals;

a plurality of lenses through which the first and second optical signals pass before entering the first beam combiner, and through which the third and fourth optical signals pass before entering the second beam combiner; and a package or housing including the optical multiplexer, the plurality of light sources, and the plurality of lenses.

19. The optical transmitter of claim 18, further comprising first and second half-waveplates, respectively configured to change an initial polarization state of (i) the first and second optical signals to the first polarization state or (ii) the third and fourth optical signals to the second polarization state, wherein each of the plurality of light sources is on a single substrate.

* * * * *